Nov. 11, 1958  W. L. COTTON  2,859,834
APPARATUS FOR HANDLING AND STORING PIPE
Filed March 25, 1954  2 Sheets-Sheet 1
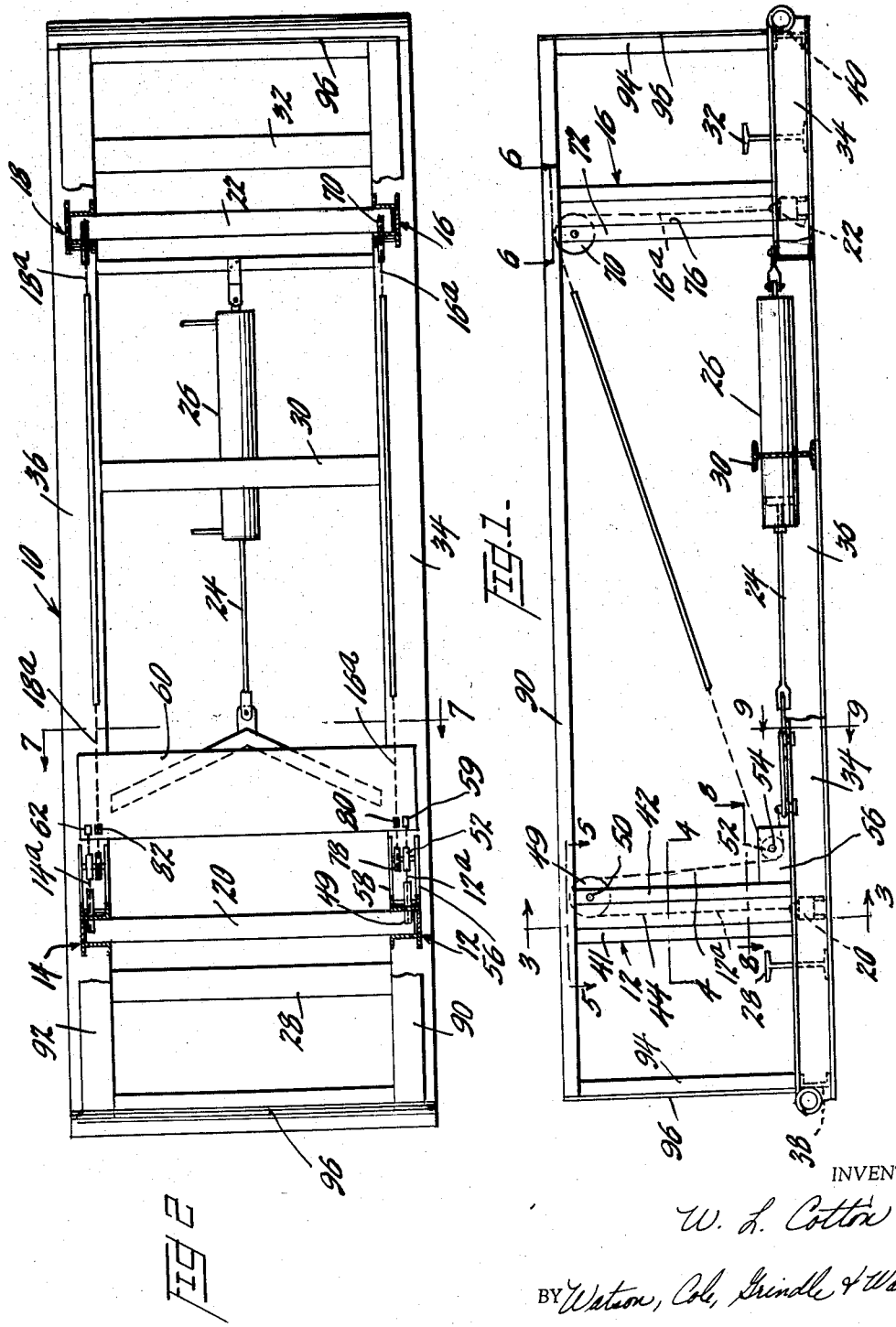
INVENTOR
W. L. Cotton
BY Watson, Cole, Grindle & Watson
ATTORNEYS

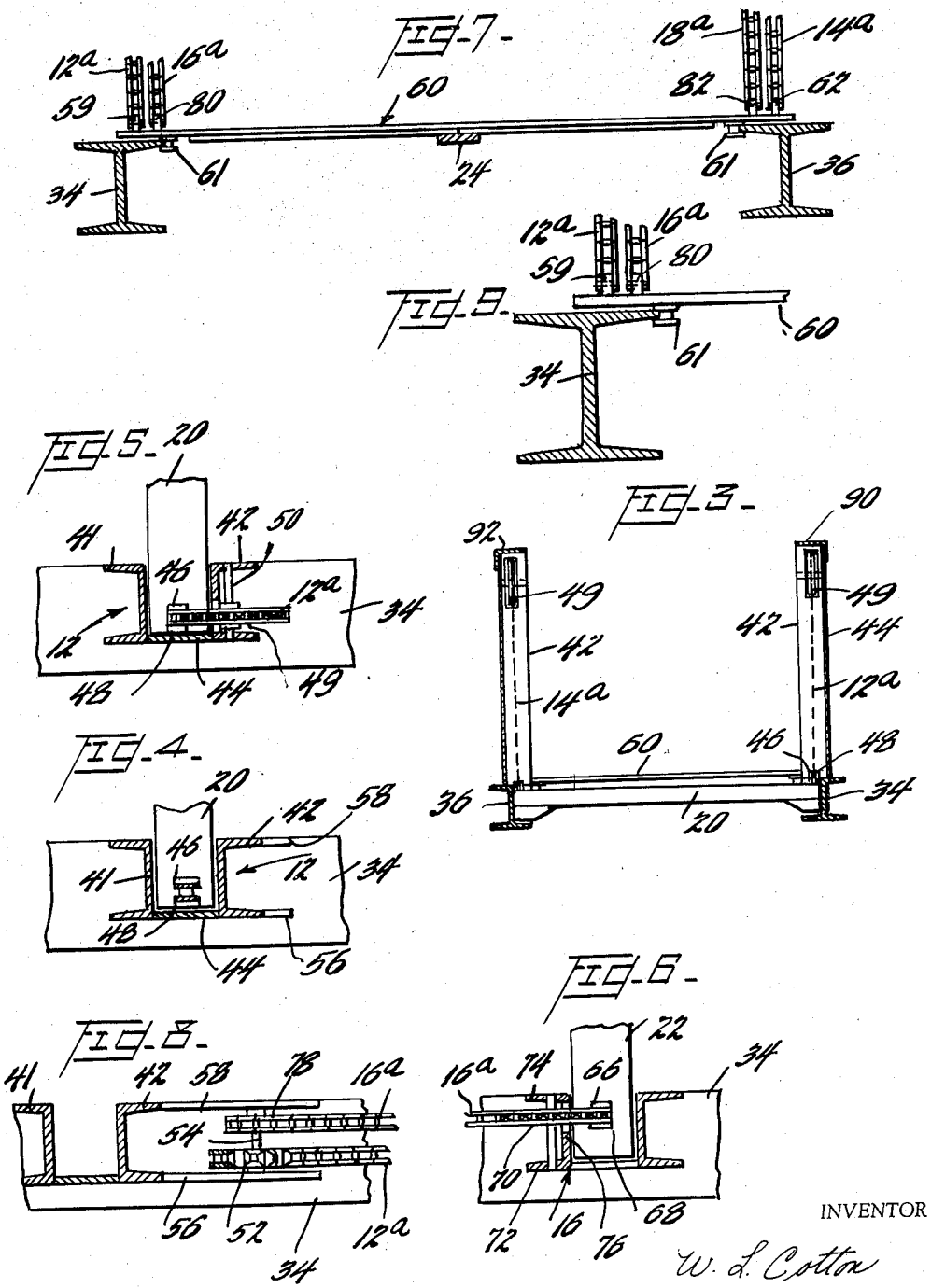

United States Patent Office 2,859,834
Patented Nov. 11, 1958

2,859,834

APPARATUS FOR HANDLING AND STORING PIPE

Willis L. Cotton, Hebbronville, Tex., assignor to W. L. Cotton, Inc., Hebbronville, Tex., a corporation of Texas Application March 25, 1954, Serial No. 418,598

2 Claims. (Cl. 187—26)

This invention relates to apparatus for handling and storing oil well drill pipe.

As is commonly known, oil wells are drilled by means of a bit which is carried on the end of a length of drill pipe, and as the bit is driven into the ground, additional lengths of drill pipe are added to that which carries the bit. As wells frequently are drilled to depths of several thousand feet, a large number of drill pipe lengths are needed. It is common practice to locate a rack for storing the lengths of drill pipe which will be needed convenient to the drilling rig, so that a hauling line from the rig may be attached to one of the stored lengths of pipe to move it into position to be joined to the pipe already in the hole. Such racks are generally 25 to 30 feet in width and 75 feet or more in length and are so formed that they support the lengths of pipe placed thereon a short distance above ground level. These racks are assembled from frame members which may be disconnected from one another and hauled from one drill location to another as required. A considerable amount of labor and haulage is involved in transporting and assembling the racks, and in addition, the design and construction of the racks is such that a number of laborious and inconvenient operations are necessarily involved in employing them, both in connection with placing pipe in the racks or removing it therefrom.

The attendant disadvantages will be apparent from the following brief resume of the presently prevailing practices. For example, in removing a length of pipe from the derrick subsequent to its withdrawal from the hole, a hauling line descending from the derrick is affixed to the upper end of the length of pipe. The pipe is then lifted clear of the derrick floor so that the lower end may be swung, by hand, into position on the upper end of a ramp which bridges between the derrick floor and the pipe rack. The upper end of the pipe is then lowered and the ramp guides the pipe to a shallow troughlike arrangement, or walk, at the center of the pipe rack. It is then necessary to draw the lower end of the pipe onto the edge of the rack which is most remote from the derrick. The hauling line is then disconnected from the pipe and the pipe is rolled, by hand, as far as possible towards one side of the pipe rack. The same procedure, in reverse, is followed in removing a length of pipe from the rack preparatorily to joining it to the string of pipe already in the hole.

When a new well is to be drilled, it is necessary that the bulky and heavy pipe rack be installed alongside the derrick at the new drilling location, and that the drill pipe be hauled to the new location and placed on the rack length by length. It is necessary either to have a duplicate set of racks, so that one may be set up at the new location to receive the pipe which will then be removed from the rack at the old location or, alternatively, to tie up the number of trucks necessary to store all the pipe until the rack at the old location can be disassembled, hauled to the new location, and reassembled.

One of the purposes of the present invention is to provide a storage apparatus for oil well drill pipe so constructed that the pipe available for use is always maintained at a convenient working height, and is protected from deformation and damage to the threaded ends of the pipe. A further object of the invention is to provide a pipe storage apparatus of this kind which is particularly suited for transportation from one work location to another without disassembling it or removing the drill pipe therefrom.

Other objects and advantages of the invention will be apparent from the following detailed description of the embodiment illustrated in the accompanying drawings as being exemplary of the invention.

In the drawings:

Figure 1 is a side elevational view, partially broken away of a pipe storage apparatus according to this invention;

Figure 2 is a top plan view of the same apparatus;

Figure 3 is a vertical sectional view on the line 3—3 of Figure 1;

Figure 4 is a horizontal sectional view on the line 4—4 of Figure 1 showing in detail the construction of the upright members of the apparatus and the relationship thereto of one of the vertically movable pipe cradles;

Figure 5 is a horizontal sectional view on the line of 5—5 of Figure 1 also showing an upright member at one end of the machine and the manner in which the sprocket around which the chain affixed to one end of the pipe cradle is passed;

Figure 6 is a similar view of an upright at the other end of the apparatus on the line 6—6 of Figure 2;

Figure 7 is a vertical sectional view on the line 7—7 of Figure 2 showing the details of the manner in which the slidable crosshead is mounted;

Figure 8 is a horizontal sectional view on the line 8—8 of Figure 1 showing the mounting of sprockets on one side of the machine around which the cradle chains are passed in order to position them for connection with the slidable crosshead shown in Figure 7; and Figure 9 is an enlarged view showing the manner in which the crosshead is slidably supported on the upper flanges of the longitudinal foundation members.

An apparatus according to this invention comprises a frame foundation generally indicated at 10 in Figures 1 and 2, and upon which are mounted uprights 12, 14, 16 and 18. A vertically movable pipe cradle is supported within this structure and consists of the transom members 20, 22 which are disposed transversely of the apparatus and arranged with respect to the uprights at corresponding ends of the apparatus so that their vertical movement is guided by the uprights, as will be explained in more detail hereinafter. The transom members 20, 22 of the cradle are arranged to move in unison, so that either end of the pipe or pipes within the apparatus will be maintained at the same level. The vertical movement of the cradle is obtained by means of chains 12a, 14a, fixed respectively to either end of the cradle transom 20 and chains 16a, 18a fixed respectively to either end of the cradle transom 22. The distal ends of these chains are connected to the piston member 24 of the piston and cylinder assembly indicated generally at 26, so that upon actuation of the assembly 26 by a fluid pressure from a suitable source, the pipe cradle may be raised or lowered as desired. It will be understood that the motive force applied to raise the cradle transom in unison may be supplied by any usual and convenient means as exemplified by the aforesaid piston and cylinder assembly. The apparatus also comprises transversely extending load bearing pipe support members 28, 30, 32 which are spaced longitudinally along the apparatus. The upper flat surface of these pipe supports are positioned vertically above the lowermost position of the transom members 20, 22 of the pipe cradle. These pipe supports are structural members which are designed to bear the weight of a full load of pipe in storage of the apparatus from one work location to another.

Referring to Figure 2, it may be seen that the foundation comprises longitudinal strength members 34, 36 to the ends of which are fixed the cross pieces 38, 40 to provide a rigid rectangular frame.

In the drawings, the longitudinal members 34, 36 consist of I-beams, having their flanges horizontally disposed. The upright members 12, 14, 16, 18 are supported, respectively, on the upper surface of the flanges of these I-beams. The uprights 12, 14 and their associated parts are identical in construction, and for simplicity of description, only the details of construction of the upright 12, and its associated parts, will be described. Similarly, the construction of the uprights 16, 18 is identical, and only a description of the upright 16, and its associated parts, will be necessary for a clear understanding of the invention.

Referring to Figures 4 and 5, it may be seen that the upright 12 comprises two channel members 41, 42 which are spaced apart longitudinally a distance slightly greater than the width of the cradle transom 20. It will also be observed that the upper flange of the I-beam 34, at its inner side, is recessed so as to form an opening immediately beneath the lower edges of the mutually facing back surfaces of the channel members 41, 42. The end of the cradle transom 20 is positioned within this recess when in its lowermost position, as illustrated in Figure 1. The mutually facing back surfaces of the channel members act as a guideway for the end of the cradle transom 20 during its vertical movement. A reinforcing spacing plate 44 is fixed between the mutually facing surfaces of the channel members 41, 42 outwardly of the end of the cradle transom 20. As previously explained, the construction of the upright 14 is similar to that of the upright 12 so that each end of the cradle transom 20 is guided within the uprights during vertical movement thereof.

The cradle transom 20 is moved vertically by means comprising the chains 12a, 14a as previously explained. It will be seen from Figures 4 and 5 that one end of the chain 12a is secured by welding or otherwise between the ears 46, 48 upstanding from the upper surface of one end of the cradle transom 20. This chain passes upwardly over the sprocket wheel 49 which, as shown in Figure 5, is supported on an axle pin 50 mounted in the opposed flanges of the channel member 42 towards the upper end thereof. The web intermediate those in which the pin 50 is supported is provided with a vertical slot of sufficient width and length to pass the sprocket wheel 49. The sprocket wheel 49 is mounted relatively to the point at which the chain 12a is fixed to the cradle so that the chain reaches vertically from the cradle transom to the periphery of the sprocket wheel 49.

As seen best in Figure 1, the chain then passes under the sprocket wheel 52 which is freely mounted on the shaft 54 supported in the plates 56, 58 which are secured to the upper flange of the I-beam 34. The relative position of these plates, and the sprocket wheel 52, may be seen best in Figure 8. The free end of the chain 12a is fixed to a lug 59 carried on the crosshead indicated generally at 60 and which crosshead is slidably supported on the I-beams 34, 36 by means of trolley rollers 61, as seen best in Figure 9. Movement is imparted to the crosshead through its connection to the piston rod 24 of the piston and cylinder assembly 26. The chain 14a fixed to the end of the cradle transom 20 slidable in the upright 14 is similarly affixed to the lug 62 on the crosshead. It will be seen, therefore, that when the piston rod 24 is moved to the right, as viewed in Figures 1 and 2, the cradle transoms 20 and 22 will be elevated.

The uprights 16, 18 and the arrangement of the cradle transom 22 with respect thereto, are essentially similar to that described above in connection with the uprights 12, 14 and the cradle transom 20. Referring to Figure 6, it will be seen that one end of the chain 16a is fixed to upstanding ears 66, 68 on the cradle transom 22. The chain 16a passes vertically upward over the sprocket wheel 70 which is supported in the mutually facing flanges 72, 74 of the channel bar 76. The intermediate web of the channel bar is vertically slotted toward the upper end thereof to pass a larger portion of the sprocket wheel 70. It will be observed that the sprocket wheel 70 is positioned nearer the longitudinal center of the frame than the sprocket wheel 49 on the upright 12 so that the chains may be brought around the parallel sprocket wheels 52, 78 supported in the plates 56, 58 in a side by side relationship. The chain 16a passes over the sprocket wheel 78 and thence to the lug 80 on the crosshead 60. The chain 18a affixed to the other end of the cradle transom 22 is similarly arranged and is attached at its free end to the lug 82 on the crosshead 60. The arrangement thus described is such that a movement to the right, as viewed in Figures 1 and 2, of the piston 24 will cause the cradle transoms 20, 22 to elevate in unison, and thereby raise, first, to the level at which the cradle will engage the pipe resting on the supports 28, 30, 32 and thereafter, raise the pipe upwardly to the desired level. Similarly, movement of the piston rod 24 to the left will lower pipe resting on the cradle to the extent that another layer of pipe may be loaded into the apparatus at the same working level at which the previous layer was placed thereon. In general, the pipe cradle consisting of the transom members 20, 22 will be elevated nearly to the top of the apparatus to receive a layer of drill pipe joints laid thereon, side by side. By actuation of the assembly 26, preferably by hydraulic pressure, the pipe cradle may then be lowered a sufficient amount to receive another layer of drill pipe separated from the first layer by wooden spacers which serve to protect the pipes from damaging one another. This process is repeated until the pipe cradle has descended in the apparatus to the point where the weight of the pipe is transferred to the pipe supports 28, 30, 32. The apparatus, or box, is then full and the box may then be loaded on a heavy winch truck and transported to a new location. It may then be placed at the point where the handling of the drill pipe will be best facilitated. As the pipe is needed for drilling, hydraulic power is supplied to assembly 26 to force the piston 24 to the right as viewed in Figures 1 and 2 to thereby raise a layer of drill pipe to the level of the top of the box where a hauling line may be easily attached to the pipe thus positioned. When the first layer of pipe is exhausted, further actuation of the assembly 26 will cause a further layer of pipe to raise up into convenient working position, and this process may be repeated until the pipe supply in the box is exhausted. It will be apparent that the same process is reversed when pipe is being taken out of the drill hole and returned to storage. It will also be evident that one or more apparatus of the kind herein described may be used in connection with a drilling rig, depending on the depth to which a hole is to be drilled. The construction of the foundation of the present apparatus is such that ground wheels may be attached thereto without difficulty, and the apparatus, containing a full load of pipe, may then be transported from one work location to another as a trailing vehicle.

Referring to Figure 1, it will be seen that angle bars 90, 92 are supported on the upper edges of the uprights 12, 16 and 14, 18. Vertical members 94 extend between the ends of these bars and the foundation 10. It is preferable to provide end plates 96 which are welded or otherwise affixed to the spaced apart vertical members 94, and thus provide a boxlike structure having solid ends which prevent the pipe contained in the cradle from slipping out lengthwise.

Other variations of the invention will be apparent to those skilled in the art, and are contemplated as being within the scope of the present invention except as otherwise indicated in the appended claims.

Having thus described the invention what is claimed as new and is desired to be secured by Letters Patent is:

1. An elongated rigid foundation, relatively horizontally spaced pairs of uprights supported on and extending vertically upwardly from said foundation, the uprights of each of said pairs being disposed on opposite sides of said foundation, a pulley carried adjacent the upper end of each upright, a cradle transom extending between each of said pairs of uprights and arranged for vertical movement with respect thereto, and means associated with said uprights for raising and lowering said cradle transoms in unison, said means having flexible strands fixed, respectively, at one end to each end of each transom, and thence being guided over the respective pulleys, a cross head slidably supported on said foundation for horizontal movement, pulley means fixedly rotatably supported on said foundation in substantial alignment with the movement of said cross head, the said strands respectively being guided around said pulley means and anchored to said cross head, whereby horizontal movement of the cross head will produce relatively equal vertical movement of the opposite ends of the respective transoms, and power means connected to said cross head for horizontally moving the cross head.

2. An apparatus as claimed in claim 1 in which said power operated means comprises a hydraulically operated cylinder and piston, said crosshead being connected to said piston and said cylinder being fixed to said foundation.

References Cited in the file of this patent

UNITED STATES PATENTS

| | | |
|---|---|---|
| 1,185,793 | Hanson | June 6, 1916 |
| 1,775,498 | Popelsky | Sept. 9, 1930 |
| 2,538,517 | Hayden | Jan. 16, 1951 |
| 2,604,996 | Smith | Feb. 29, 1952 |